UNITED STATES PATENT OFFICE.

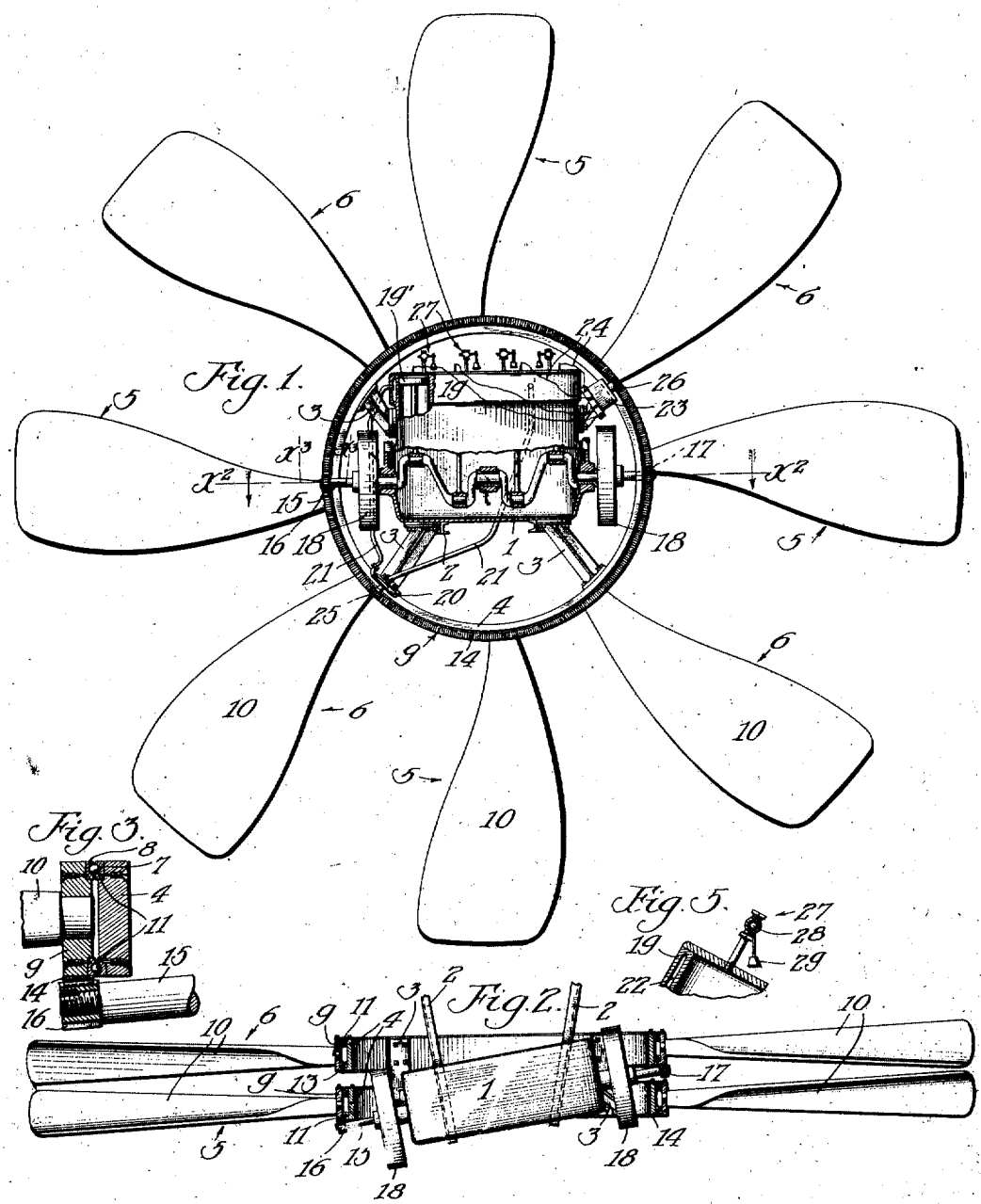

ALBERT B. HOLSON, OF LOS ANGELES, CALIFORNIA.

BALANCED-PROPELLER GEAR.

1,001,956.  Specification of Letters Patent.  Patented Aug. 29, 1911.

Application filed October 11, 1910. Serial No. 586,546.

*To all whom it may concern:*

Be it known that I, ALBERT B. HOLSON, a citizen of the United States, residing at Los Angeles, in the county of Los Angeles and State of California, have invented a new and useful Balanced-Propeller Gear, of which the following is a specification.

The main object of the invention is to provide simple and efficient means for large reduction of the speed of a pair of oppositely rotating devices such as propellers, as compared with that of the driving engine, thereby enabling an engine of minimum size and weight to be used, and reducing friction to a minimum.

This invention relates particularly to the operation of propellers intended for use in aerial navigation, and one object of the invention is to provide a propeller for such purpose which will be balanced in its action, so that it will not have any rotative effect on the aeroplane or dirigible balloon with which it is connected.

Other objects and advantages of the invention will appear hereinafter.

The accompanying drawings illustrate the invention, and referring thereto: Figure 1 is an end elevation of the propeller and the driving means therefor, with the engine partly in section. Fig. 2 is a section on line $x^2-x^2$ in Fig. 1. Fig. 3 is a section on line $x^3-x^3$ in Fig. 1. Fig. 4 is a side elevation of the pump for the water cooling system of the engine. Fig. 5 is a partial section of the cylinder, showing an automatic valve attached thereto for release of pressure from the cylinder when the machine is tipped at an unusually steep angle.

1 designates the motor or engine which may be supported on or connected to the bars 2 forming part of the main frame of an aeroplane or other aerial navigation machine. Supported on or connected to the motor 1 by frame bars 3 are stationary rings 4 which serve to support two propellers 5 and 6, said propellers being mounted to turn on said rings by ball bearings comprising annular race ways 7 and 8, respectively, fixed on the stationary rings 4 and on rings 9 carrying the propeller blades 10 and balls 11 running in said race ways. The rotative rings 9 for the respective propellers are provided respectively with annular gears or gear rings 13 and 14 and the shaft 15 of the motor is provided at opposite ends with pinions 16, 17 engaging said gear rings 13 and 14, respectively, said pinions engaging with the respective gear rings on opposite sides of the rotative axis of the gear rings and on the same side of the axis of the pinions, so that the propeller rings 9 are rotated in opposite directions. The blades 10 of the propellers are pitched or inclined in opposite directions in the respective propellers, so that in the opposite rotations of the two propellers, the reactive effect on the air is in the same direction.

The motor shaft 15 carries fly-wheels 18, a fly-wheel being preferably provided at each end of the motor, so as to balance the weight and the gyratory actions. The pinions 16 are preferably of small diameter, as compared with the diameter of the gear rings 13 and 14, so that there is a large speed-reduction between the motor and the propellers, the motor therefore rotating at extremely high speed. This enables a motor of extremely light weight and small size to be used for a given power or output and, on account of the high speed of the motor shaft 15, the fly-wheels 18 thereon present maximum gyrostatic action tending to maintain the stability of the machine.

The motor or engine 1 is preferably of the internal combustion type, comprising cylinders 19 with pistons 19' connected to rotate the shaft 15. The gear rings aforesaid, or one of them, may conveniently be used for operation of the several power driven elements of the machine, for example, the pump 20 for circulating the cooling water through pipes 21 and water jacket 22 and the magneto 23 for the sparkling system, indicated by wires 24. For this purpose gear ring 14 engages pinions 25, 26 respectively on the shafts of the pump 20 and of the magneto 23.

Means are preferably provided for utilizing the propellers in retarding the descent of the machine, for example, when it pitches forward at such a steep angle as to endanger the safety of the aviator. For this purpose a pet-cock 27 is provided in each engine cylinder, said pet-cock being normally maintained closed by a valve 28, said valve being connected to a depending weight or pendulum 29 which normally hangs in vertical position holding the valve closed, but which tips, as shown in Fig. 5, to open the valve when the machine tips at a dangerous angle. The pistons then operate more or less freely in the respective cylinders of the engine, the two propellers being operated by the passage of the machine through the air and the engine being driven by the action of the propellers, thereby retarding the descent of the machine, the propellers having the effect of a parachute.

While the speed reducing mechanism above described is particularly adapted and intended for use in connection with a balanced propeller, as above described, it is applicable in connection with any two members which are to be driven in opposite directions and at low speed, as compared with the driving motor.

What I claim is:

1. The combination of two rotatable driven members, annular gears on said members, a driving member, pinions on said driving member engaging with said annular gears, the engagement being on opposite sides of the rotative axis of the annular gears and on the same side of the axis of said pinions, whereby said annular gears and the members connected thereto are rotated in opposite directions.

2. The combination of two propellers having oppositely fixed blades, annular gears connected to the respective propellers, a motor mounted within said annular gears and comprising a shaft, pinions on said motor shaft engaging respectively with said annular gears to rotate said propellers in opposite directions, the blades of said propellers being oppositely pitched, so that in their reverse rotation, the reactive effect of the propellers on the air will be in the same direction.

3. The combination of two propellers comprising rings and blades extending therefrom, annular bearings on which said rings are mounted to rotate, annular gears on the respective rings, a motor inclosed within said annular bearings and connected thereto, said motor comprising a shaft and means for rotation thereof, pinions on said shaft at opposite ends of said motor engaging respectively with said annular gears to drive the annular gears in opposite directions, the blades of the propellers being oppositely pitched, so that in the reverse rotation thereof the reactive effect on the air will be in the same direction.

In testimony whereof, I have hereunto set my hand at Los Angeles, California, this 5th day of October, 1910.

ALBERT B. HOLSON.

In presence of—
ARTHUR P. KNIGHT,
FRANK L. A. GRAHAM.